United States Patent Office 3,393,171
Patented July 16, 1968

3,393,171
METHOD OF ACCELERATING THE HARDENING OF EPOXY COMPOUNDS
Wilhelm Vogt, Cologne-Sulz, Paul Janssen, Cologne, and Hermann Richtzenhain, Cologne-Sulz, Germany, assignors to Dynamit Nobel Aktiengesellschaft, Troisdorf, Bezirk Cologne, Germany, a corporation of Germany
No Drawing. Filed July 6, 1965, Ser. No. 469,924
Claims priority, application Germany, July 6, 1964, D 44,858
10 Claims. (Cl. 260—30.4)

ABSTRACT OF THE DISCLOSURE

There is disclosed an improved method of preparing hardened epoxy resins. The method comprises reacting a polyepoxide compound with a hardener compound containing at least two members selected from the group consisting of —NH and —$NH_2$ groups and selected from the group consisting of aliphatic, cycloaliphatic and aromatic diamines and amidoamines of carboxylic acids in the presence of at least one sultone as accelerator for said hardening.

---

This invention relates to epoxy compounds. It more particularly relates to the hardening of epoxy compounds containing at least two epoxy groups in their molecules, and specifically relates to a method of accelerating hardening of epoxy compounds containing at least two epoxy groups in their molecules, and to the improved epoxy resins thereby produced.

Hardened epoxy resins prepared in accordance with the invention can be used as rapidly-hardening casting resins, coating compositions, varnish resins, and adhesives. These resins may have fillers, pigments, dyestuffs, and/or plasticizers incorporated therewith as desired or indicated.

Hardened epoxy resins can be prepared from epoxy compounds containing two or more epoxy groups per monomer molecule. Epoxy compounds of this type are exemplified by the polyepoxides of vinyl cyclohexene, dicyclopentadiene, cyclohexadiene, cyclododecatriene, butadiene, polybutadiene, divinylbenzene; oligomers of epichlorhydrin and the like; epoxy ethers of polyhydric alcohols such as ethylene, propylene and butylene glycols, polyglycols, thiodiglycols, glycerin, pentaerythritol, sorbitol, polyvinyl alcohol, polyallyl alcohol and others; epoxy ethers of polyhydric phenols as illustrated by resorcinol,
hydroquinone,
bis-(4-hydroxyphenyl)-methane,
bis-(4-hydroxy-3-methylphenyl)-methane,
bis-(4-hydroxy-3,5-dichlorophenyl)-methane,
bis-(4-hydroxy-3,5-dibromophenyl)-methane,
bis-(4-hydroxy-3,5-difluorophenyl)-methane,
1,1-bis-(4-hydroxyphenyl)-ethane,
2,2-bis-(4-hydroxyphenyl)-propane,
2,2-bis-(4-hydroxy-3-methylphenyl)-propane,
2,2-bis-(4-hydroxy-3-chlorophenyl)-propane,
2,2-bis-(4-hydroxy-3,5-dichlorophenyl)-propane,
bis-(4-hydroxyphenyl)-phenyl methane,
bis-(4-hydroxyphenyl)-diphenyl methane,
bis-(4-hydroxyphenyl)-4′-methylphenylmethane,
1,1-bis-(4-hydroxyphenyl)-2,2,2-trichloroethane,
bis-(4-hydroxyphenyl)-(4-chlorophenyl)-methane,
1,1-bis-(4-hydroxyphenyl)-cyclohexane,
bis-(4-hydroxyphenyl)-cyclohexylmethane,
4,4′-dihydroxydiphenyl,
2,2′-dihydroxydiphenyl,
4,4′-dihydroxydiphenyl sulfone as well as their hydroxyethyl ethers and phenolformaldehyde condensation products; N-containing epoxides as for instance N,N-diglycidylaniline, N,N′-dimethyldiglycidyl-4,4-diaminodiphenylmethane; epoxides which have been prepared by customary methods from poly-unsaturated carboxylic acids or mono-unsaturated carboxylic acid esters of unsaturated alcohols, glycidyl esters, polyglycidyl esters which can be obtained by polymerization or copolymerization of glycidyl esters of unsaturated acids or are obtainable from other acid compounds such as from cyanuric acid and cyclic trimethylene trisulfone or their derivatives, etc. Mixtures of these epoxides can be used as well as the individual compounds to produce hardened epoxy resins.

Further mono-epoxides such as those prepared by epoxidizing mono-olefinically unsaturated hydrocarbons as, for example, ethylene, propylene, butylene, cyclohexene, and styrene, as well as halogen-containing epoxides such as epichlorhydrin, epoxy ethers of monohydric alcohols such as, for example, methyl-, ethyl-, butyl-, 2-ethylhexyl-, dodecyl-alcohol, and the like; epoxy ethers of monohydric phenols as for instance of phenol, cresol, as well as of other phenols substituted in ortho- or para-positions; glycidyl esters of unsaturated carboxylic acids, epoxidized esters of unsaturated alcohols and unsatuarted carboxylic acids as well as the acetals of glycidaldehyde, can be used in combination with multiple epoxide-containing compounds to produce hardened epoxy resins.

These aforementioned epoxy compounds and mixtures of compounds are suitably hardened by reaction with compounds containing two or more —NH and/or —$NH_2$ groups therein, such as the aliphatic, cycloaliphatic, aromatic and heterocyclic amines, imines, amides and imides, which contain at least two of the said functional groups, the amidoamines of carboxylic, sulfonic and sulfocarboxylic acids, the ethers and oxyamines, as well as the polymeric amines, imines, amides and imides. These hardeners may contain two or more of each of the —NH or —$NH_2$ groups or at least one —NH and one —$NH_2$ group in their molecules. They are preferably brought to reaction in such quantities that one hydrogen atom bound to amine nitrogen is available for each epoxy group.

Despite the fact that hardening of epoxy resins is well known in the art, great disparities can exist in the speed of the hardening of any particular epoxy resin with any particular hardener. Since, in almost every case, rapid hardening is desirable, there have been numerous attempts to accelerate these hardening reactions. As accelerating compounds there have already been proposed various phenol and phenol derivatives such as 2,4,6-tris-(dimethylaminomethyl)-phenol, known commercially as DMP 30. Alcohols, mercaptans, carboxylic acids, carbonamides and sulfonamides having free amide hydrogen have also been proposed as accelerator for reacting epoxy compounds with amines. The acceleration of the amine hardening which can be obtained with the aforesaid compounds is, however, generally not sufficient or satisfactory for practical requirements.

It is, therefore, an object of this invention to provide a method of accelerating the hardening of epoxy resins.

It is another object of this invention to provide a composition which is readily hardenable at accelerated rates.

It is a further object of this invention to provide a novel hardening accelerator for epoxy resins.

It is a still further object of this invention to produce a novel hardened epoxy resin composition.

Other and additional objects will be apparent from a consideration of the instant specification and the claims appended hereto.

In accordance with and fulfilling the objects, this invention comprises in one of its aspects the use of sultones to accelerate the —NH and/or —NH$_2$ hardening of epoxy resins. Substantially any of the sultones can be used in the practice of this invention but particularly good results have been obtained with 1,3- and 1,4-sultones, that is, the sulfonic acid analogous to γ- and Δ-lactones, respectively. The sultones represent neutral, non-ionic accelerators which can be mixed with the epoxy resin at room temperature and become active only after addition of the amine component added as hardening agent and then accelerate the hardening. Even relatively small quntities of sultones cause a substantial decrease in the hardening time. The quantity of accelerator added can be varied within a wide range depending on the reactivity of the amine or epoxy component. Generally, amounts of accelerator of 0.1 to 5% by weight, based upon the weight of epoxy compound used for the hardened resin are employed, but smaller or larger amounts of accelerator may also be particularly advantageous.

The most preferred of the sultones which have been set out herein is propane-1,3-sultone; butane-1,4-sultone can also be very advantageously employed as accelerator.

The following examples are given by way of illustration and are in no way intended to be limiting upon the scope of the instant invention:

EXAMPLE 1

50 grams of a diglycidyl ether of 2,2-bis-(4-hydroxyphenyl)-propane having an epoxy value of 0.53/100 grams of resin were hardened with 14 grams N-cyclohexyl-1,3-propylene diamine and 1 gram of propane sultone at room temperature and the time for gelation to take place measured and found to amount to 18 minutes.

When the procedure was repeated but without the addition of propane sultone, the gelation time amounted to 145 minutes. The procedure was again repeated but with addition of 1 gram of 1,4-butane sultone, and in this instance a gelation time of 83 minutes measured.

EXAMPLE 2

50 grams of a diglycidyl ether of 2,2-bis-(4-hydroxyphenyl)-propane as described in Example 1 were hardened at room temperature with 27 grams of a hardening agent of the type of an amidoamine of a partially dimerized fatty acid, commercially available under the designation GMI 250 [1] and 1 gram of propane sultone, and the gelation time determined and found to be 25 minutes. When the run was repeated without propane sultone, a gelation time of 100 minutes was measured and with 1 gram of 1,4-butane sultone, the gelation time amounted to 65 minutes.

EXAMPLES 3a–6d

These examples show the acceleration of the hardening of in each case 50 grams of a diglycidyl ether of 2,2-bis-(4-hydroxyphenyl)-propane, corresponding to the product of Example 1, with the indicated types of hardener as a function of the concentration of the added hardening accelerator. The hardening in each case was carried out at room temperature (about 22° C.).

| Examples | Propane sultone (grams) | Gelation time (in minutes) | | | |
|---|---|---|---|---|---|
| | | a<br>14 grams N-cyclo-hexyl-propylene diamine | b<br>27 grams hardener GMI 250 [1] | c<br>27 grams hardener GMI 350 [1] | d<br>27 grams hardener Versamid 140 [1] |
| 3a–d | 0 | 145 | 100 | 460 | 470 |
| 4a–d | 0.25 | 55 | 65 | 205 | 130 |
| 5a–d | 0.5 | 33 | 38 | 140 | 100 |
| 6a–d | 1.0 | 18 | 25 | 90 | 70 |

[1] Commercial products of the Schering AG, Bergkamen, West Germany.

EXAMPLE 7

A mixture of 45 grams of a diglycidyl ether of 2,2-bis-(4-hydroxyphenyl)-propane and 5 grams of 2-ethylhexyl-glycidylether having an epoxy-value of 0.53/100 grams of resin were hardened with 14 g. of bis-(γ-aminopropoxy)-butane-(1,4) and 1 gram of propane sultone at room temperature and the time for gelation to take place measured and found to amount to 17 minutes. When the procedure was repeated but without the addition of propane sultone, the gelation time amounted to 80 minutes.

EXAMPLE 8

50 grams of a diglycidyl ether of resorcinol having an epoxy value of 0.79/100 grams of resin were hardened with 21 grams bis-(γ-amino-propoxy)-butane-(1,4) and 1 gram of propane sultone at room temperature and the time for gelation to take place measured and found to amount to 4 minutes. When the procedure was repeated, but without the addition of propane sultone, the gelation time amounted to 15 minutes.

EXAMPLE 9

50 grams of a diglycidyl ether of 2,2-bis-(4-hydroxyphenyl)-propane having an epoxy value of 0.53/100 grams of resin were hardened with 13 g. 4,4'-diaminodiphenylmethane and 1 g. of propane sultone at 90° C. and the time for gelation to take place measured and found to amount to 18 minutes. When the procedure was repeated, but without the addition of propane sultone, the gelation time amounted to 60 minutes.

EXAMPLE 10

50 g. of a glycidyl novolak (a phenol-formaldehyde-condensation product) having an epoxy value of 0.54/100 grams of resin were hardened with 13 g. 4,4'-diaminodiphenylmethane and 1 gram of propane sultone at 90° C. and the time for gelation to take place measured and found to amount to 10 minutes. When the procedure was repeated, but without the addition of propane sultone, the gelation time amounted to 20 minutes.

The mechanical properties of the epoxide resins hardened with amine hardeners with addition of 1,3-sultones are excellent as a result of the faster hardening and the stronger cross-linking caused thereby.

We claim:

1. In the process of producing hardened epoxy resins by reacting at least one polyepoxide compound with a hardener compound containing at least two members selected from the group consisting of —NH$_2$ and —NH groups and selected from the group consisting of aliphatic, cycloaliphatic and aromatic diamines at a temperature of from ambient to 90° C. to form said hardened epoxy resin, the improvement which comprises accelerating said hardening by incorporating into the said reaction mixture a catalytic quantity of at least one sultone.

2. The improved process claimed in claim 1, wherein said sultone is selected from the group consisting of 1,3- and 1,4-sultones.

3. The improved process claimed in claim 1, wherein said sultone is present in proportions of about 0.1 to 5.0 weight percent based on the weight of said epoxy compound.

4. The process claimed in claim 1 wherein said epoxy compound is a diglycidyl ether of 2,2-bis-(4-hydroxyphenyl)-propane, said hardener compound is N-cyclohexyl-1,3-propyldiamine and said sultone is propane sultone.

5. The process claimed in claim 1, wherein said epoxy compound is a diglycidyl ether of 2,2-bis-(4-hydroxyphenyl)-propane, said hardener compound is N-cyclohexyl-1,3-propyldiamine and said sultone is propane sultone.

6. The improved process claimed in claim 1, wherein said epoxy compound is present in admixture with a monoepoxy compound.

7. The hardened product of the improved process claimed in claim 1.

8. A composition comprising at least one polyepoxide-containing compound and a sultone.

9. The composition claimed in claim 8 containing 0.1 to 5.0% by weight of sultone.

10. The composition claimed in claim 8 wherein said sultone is selected from the group consisting of propane-1,3-sultone and butane-1,4-sultone.

References Cited
UNITED STATES PATENTS

| | | | |
|---|---|---|---|
| 3,294,743 | 12/1966 | Mack | 260—47 |
| 3,100,779 | 8/1963 | Mannheimer | 260—327 |
| 2,988,535 | 6/1961 | Feuchtbaum et al. | 260—47 |
| 2,886,472 | 5/1959 | Condo et al. | 260—47 X |
| 2,631,138 | 3/1953 | Dannenberg | 260—47 X |

DONALD E. CZAJA, *Primary Examiner.*

C. W. IVY, *Assistant Examiner.*